United States Patent
Lian et al.

(10) Patent No.: US 10,563,884 B2
(45) Date of Patent: Feb. 18, 2020

(54) AUTO ADDRESSING FOR HVAC UNITS

(71) Applicant: Lennox Industries Inc., Richardson, TX (US)

(72) Inventors: Hongbing Lian, Plano, TX (US); Saravanakumar Selvarajan, Tamil Nadu (IN); Cheng Liang Xu, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 47 days.

(21) Appl. No.: 15/881,933

(22) Filed: Jan. 29, 2018

(65) Prior Publication Data

US 2019/0234639 A1 Aug. 1, 2019

(51) Int. Cl.
| | | |
|---|---|---|
| *F24F 11/54* | (2018.01) | |
| *F24F 11/63* | (2018.01) | |
| *F24F 11/30* | (2018.01) | |
| *F24F 140/00* | (2018.01) | |
| *H04L 29/08* | (2006.01) | |

(52) U.S. Cl.
CPC .............. *F24F 11/54* (2018.01); *F24F 11/30* (2018.01); *F24F 11/63* (2018.01); *F24F 2140/00* (2018.01); *H04L 67/12* (2013.01)

(58) Field of Classification Search
None
See application file for complete search history.

(56) References Cited

U.S. PATENT DOCUMENTS

| | | | | |
|---|---|---|---|---|
| 4,638,313 A * | 1/1987 | Sherwood, Jr. | ..... | G06F 12/0661 340/9.16 |
| 2010/0295700 A1* | 11/2010 | Mauk | ................. | H01R 13/6456 340/9.1 |
| 2012/0271924 A1* | 10/2012 | Spitaels | .............. | H04L 61/2092 709/220 |
| 2012/0306621 A1* | 12/2012 | Muthu | ............... | H05B 37/0272 340/8.1 |
| 2014/0173013 A1 | 6/2014 | Liu et al. | | |
| 2015/0163945 A1* | 6/2015 | Barton | .................. | G05B 15/02 361/809 |
| 2016/0021596 A1* | 1/2016 | Hui | ....................... | H04W 40/04 370/329 |
| 2016/0234650 A1* | 8/2016 | Kats | ..................... | H04W 16/18 |

FOREIGN PATENT DOCUMENTS

| | | |
|---|---|---|
| EP | 0180990 A2 | 5/1986 |
| EP | 0180990 A3 | 5/1986 |

OTHER PUBLICATIONS

European Patent Office, Extended European Search Report, Application No. 19154338.8, dated May 29, 2019, 7 pages.
European Patent Office, Communication pursuant to Article 94(3), Application No. 19154338.8, dated Nov. 29, 2019, 6 pages.

* cited by examiner

*Primary Examiner* — Bernard G Lindsay

(74) *Attorney, Agent, or Firm* — Baker Botts L.L.P.

(57) ABSTRACT

According to certain embodiments, a system comprises a primary unit and a plurality of secondary units each having a unique unit number. The primary unit is configured to communicate a command to each secondary unit with instructions to reply during a time window. The primary unit is also configured to receive a reply communication indicating the secondary unit's unique unit number from at least one of the secondary units, and determine an address to assign to the replying secondary unit based at least in part on the received unique unit number.

17 Claims, 4 Drawing Sheets

AUTO ADDRESSING FOR HVAC UNITS

TECHNICAL FIELD

Certain embodiments of the present disclosure relate generally to heating, ventilation, and air conditioning (HVAC) systems and more particularly to automatic addressing for HVAC units.

BACKGROUND

Heating ventilation and air conditioning (HVAC) systems may lower the temperature and remove humidity from a conditioned space by employing a refrigeration cycle where compressed refrigerant is circulated throughout the system. One class of HVAC systems, variable refrigerant flow systems, may perform this same refrigeration cycle at intermediate speeds during partial-load conditions, allowing for efficiency gains compared to conventional systems.

These systems may implement multiple linked units to provide coverage for larger areas and allow for more added control of refrigerant conditions between zones. The complexity of such systems requires distributed controllers that are networked together in order to achieve the improved system control. To operate over such a network, each unit on the network must have a unique address to facilitate proper communication. Manual configuration of each unit address can be difficult and time-intensive, especially with many controllers in unknown or physically inaccessible locations.

SUMMARY OF THE DISCLOSURE

According to certain embodiments, a system comprises a primary unit and a plurality of secondary units which each have a unique unit number. The primary unit is configured to communicate a first command with instructions to reply during a time window to each secondary unit, receive a reply communication indicating the secondary unit's unique unit number from at least one of the secondary units, and determine an address to assign to the secondary unit based at least in part on the unique unit number received from the secondary unit's reply.

In some embodiments, the primary unit is further configured to communicate the assigned address to the corresponding secondary unit.

In some embodiments, the primary unit is further configured to display a number of secondary units for which the primary unit maintains an associated address. In some embodiments, the primary unit is further configured to communicate a second command with instructions to reply during a second time window, receive a reply communication indicating the secondary unit's unique unit number from at least one of the secondary units that has not been assigned an address, and determine an address to assign to the secondary unit based at least in part on the unique unit number received from the secondary unit's reply.

In some embodiments, the secondary unit is configured to calculate a time slot within the time window and to send the reply communication within the time slot. In some embodiments, the secondary unit is configured to determine not to reply to the first command if the secondary unit already has an assigned address. In some embodiments, the unique unit number is the secondary unit's serial number.

In some embodiments, the system comprises a heating ventilation and air conditioning (HVAC) system, the primary unit comprises a controller communicatively coupled to the system via a network, and the secondary unit comprises a refrigeration component and a controller communicatively coupled to the system via a network.

In some embodiments, the primary unit is further configured to communicate an HVAC-related configuration to one of the secondary units using the assigned address. The secondary unit to which the HVAC-related configuration is addressed is further configured to use the HVAC-related configuration to perform an HVAC-related operation.

In some embodiments, the primary unit is further configured to detect a bus contention based on receiving a reply communication from a first secondary unit and a reply communication from a second secondary unit during a same time slot within the time window. Based on detecting the bus contention, the primary unit determines not to assign an address to the first secondary unit. The primary unit is further configured to communicate a second command comprising a second instruction to reply during a second time window to the first secondary unit, receive a second reply communication indicating the first secondary unit's unique unit number from the first secondary unit that does not cause a bus contention in response to the second command, and determine an address to assign to the first secondary unit based at least in part on the unique unit number received from the first secondary unit's reply.

In some embodiments, the primary unit is further configured to receive a first reply communication from a first secondary unit, perform a cyclic redundancy check (CRC) on the first reply communication, and detect an error with the first reply communication based on the CRC. Based on detecting the error with the first reply communication, the primary unit determines not to assign an address to the first secondary unit. The primary unit is further configured to communicate a second command comprising a second instruction to reply during a second time window to the first secondary unit, receive a second reply communication from the first secondary unit in response to the second command that passes the CRC and indicates the first secondary unit's unique unit number, and determine an address to assign to the first secondary unit based at least in part on the unique unit number received from the first secondary unit's reply.

Certain embodiments may provide one or more technical advantages. As an example, certain embodiments provide advantages over manual configuration of unit addresses on a network. Such a system may save time and physical toll from moving between units in order to manually assign each address to each unit on a network. As another example, certain embodiments may also have the advantage of making it easier for a technician to identify all units communicatively coupled to the system. As another example, certain embodiments may be advantageous for performing software upgrades on already-installed systems. As another example, certain embodiments may also have the advantage of making it easier to add new units to an existing system because the newly added unit may be assigned an address when coupled to the network by broadcasting another command from the primary unit on the network.

Certain embodiments may include all, some, or none of the above-described advantages. Other advantages will be apparent to those of ordinary skill in the art.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 6 of the drawings, like numerals being used for like and corresponding parts of the various drawings.

Heating ventilation and air conditioning (HVAC) systems, such as heat pump systems, air conditioning systems, combined heating-and-air conditioning systems, and refrigeration systems, each function to condition a space. As an example, an HVAC system configured to perform air conditioning functionality may lower the temperature and remove humidity from the conditioned space. The HVAC system may achieve this desirable effect by employing a refrigeration cycle. By compressing a refrigerant and circulating the compressed refrigerant through the HVAC system, usually first through a condenser, then through an expansion valve, and lastly through an evaporator before returning to the compressor, cooling may be achieved within the conditioned space. One type of HVAC system, known as a variable refrigerant flow (VRF) system, operates using the same refrigeration cycle but may adjust the temperature and rate of cooling by adjusting the rate at which refrigerant is compressed and cycled through the system. This is unlike conventional HVAC systems which regulate the cooling rate by simple on/off operation. By operating only at the needed refrigerant flow rate, VRF systems may allow for more desirable conditioned spaced by providing more steady conditioned air and doing so more efficiently.

Larger VRF systems may utilize multiple refrigeration units in order to provide greater thermal influence over a space and also to provide more selective heat transfer between various spaces. In some systems, there may be an outdoor unit linked to at least one indoor unit. In especially large systems, multiple outdoor units may be linked together along with their associated indoor units to form a single connected system. For these larger systems, each unit may have its own controller to set the HVAC-configurations for that individual unit. These multiple controllers may all be communicatively coupled via a network to allow for more complete control over the entire system rather than on a unit-by-unit basis. For example, the network may be facilitated by connecting the controllers using a balanced multipoint connection, such as RS485 serial cables. To provide appropriate communication between coupled units, each unit must have a unique address so that HVAC-related configurations may be communicated to specific units to distribute the desired overall HVAC configuration. For example, the HVAC related configuration may be software, firmware, and/or one or more parameter settings. Rather than manually assign each address to each unit and provide the assigned addresses to the primary unit, the networked units may reply with a unique unit number for each unit and then be assigned an address from the primary unit.

Figure 1:
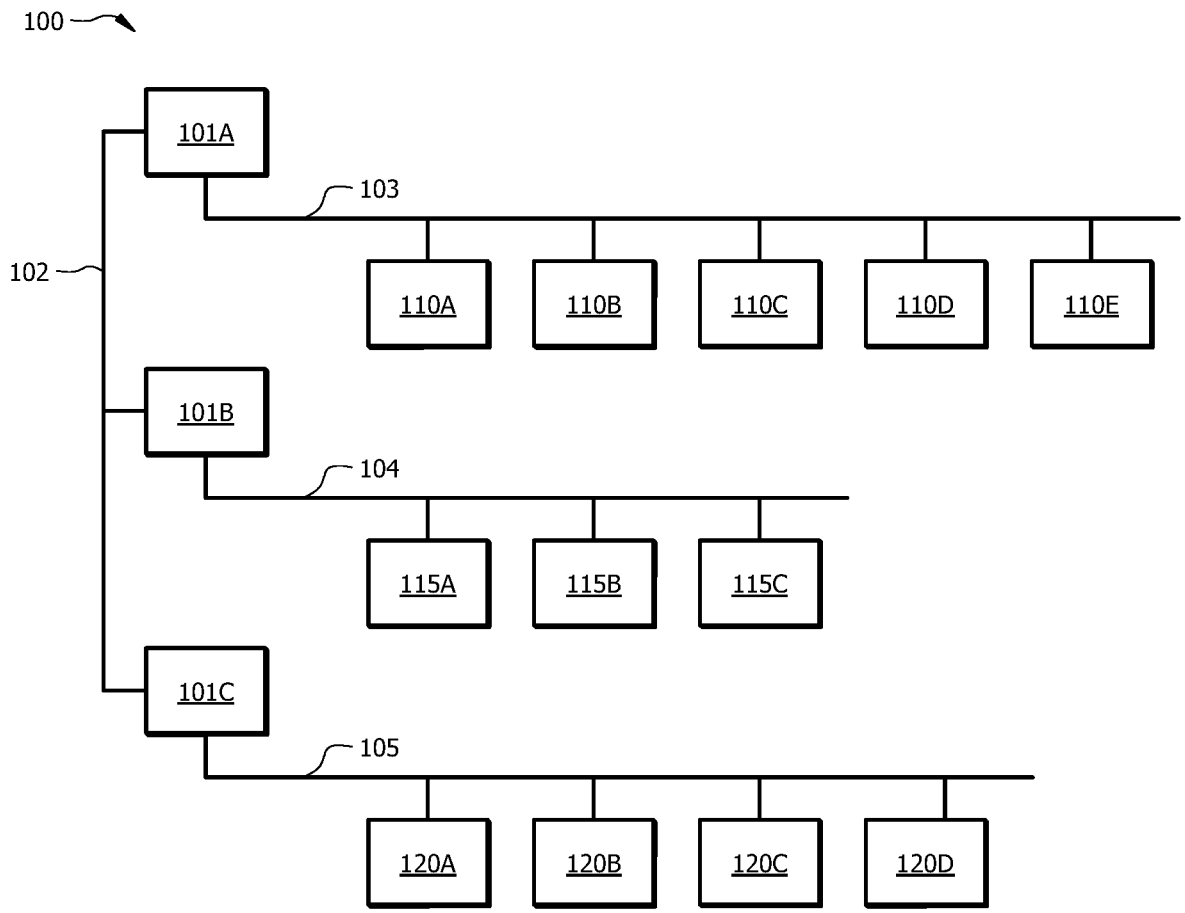
FIG. 1 illustrates an example system of networked units.

FIG. 1 illustrates an example system including a plurality of units communicatively coupled to a network. It is understood that embodiments show are simply used as examples and that the invention is not restricted to these embodiments alone. As illustrated in FIG. 1, a system 100 includes networks 102-105. Network 103 communicatively couples primary unit 101A to secondary units 110A-110E. In certain embodiments primary unit 101A may be coupled to any number of secondary units 110 via network 103. Network 104 communicatively couples primary unit 101B to secondary units 115A-115C. In certain embodiments primary unit 101B may be coupled to any number of secondary units 115 via network 104. Network 105 communicatively couples primary unit 101C to secondary units 120A-120D. In certain embodiments primary unit 101C may be coupled to any number of secondary units 120 via network 105. Network 102 communicatively couples primary units 101A-101C. In certain embodiments, network 102 may couple any number of primary units 101. In some embodiments, networks 102-105 may be connecting the units using a balanced multipoint connection, such as RS485 serial cables.

In certain embodiments, units 101, 110, 115, and 120 may be either the kind of units described in more detail later in FIG. 2 and FIG. 3. Units 101, 110, 115, and 120 may each have a controller, a refrigeration component, both, or neither.

In certain embodiments, units 101 may be primary units and units 110, 115, and 120 may be secondary units. In some embodiments, primary units 101 may be outdoor units and secondary units 110, 115, and 120 may be indoor units. This disclosure may refer generally to primary unit 101, but it is understood that this may refer to any primary unit 101A, 101B, 101C, or additional primary units not depicted. Likewise, this disclosure may refer to secondary units 110, but it is understood that this may refer to any secondary units 110, 115, and/or 120.

In certain embodiments, primary units 101 may initiate communication with secondary units and secondary units reply only to communications from primary units in a master-slave network configuration. In certain embodiments when a system 100 has multiple primary units 101 networked together through network 102, a single primary unit 101 may act as the primary unit for its own secondary units and also act as the primary unit for the other units 101 within network 102.

In certain embodiments, only a single primary unit 101 and its associated secondary units 110 may be necessary. For example, for smaller systems only primary unit 101A and secondary units 110A-110D may be linked together via network 103 and the remaining units 110E, 101B-101C, 115A-115C, and 120A-120D may not be included. In some embodiments, system 100 may not link primary units 101A-101C with network 102 and they may act independently as primary units for their associated secondary units. In some embodiments, units 110, 115, and 120 may be of the same type.

In certain embodiments, primary unit 101A may have a topology map containing the unique unit number of all of the units coupled to system 100. For example, the unique unit number of each unit may be the unit's serial number. In some embodiments, primary unit 101A may build the topology map automatically or the topology information may be manually entered for each unit on the system. In some embodiments, the primary unit may use the topology information in the topology map to assign an address to each unit to facilitate proper communication. For example, in certain embodiments, each primary unit 101 may be coupled to up to sixty-four secondary units 110 and may assign each of them a hexadecimal group identifier address from 01h-40h, and reserve the address 00h as the broadcast identifier for all units to receive the communication over networks 102-105. In some embodiments, multiple primary units 101 may be coupled together on network 102. For example, each primary unit 101 may be assigned a hexadecimal group identifier address of A0h, A1h, A4h, A5h, A6h, A8h, A9h, AAh, ACh, ADh, and AEh, where A0h, A4h, A8h, and ACh are reserved for the master primary units. With an address associated with each unit's unique unit number in the topology map, the master primary unit 101A may communicate with any individual unit on system 100.

Figure 2:
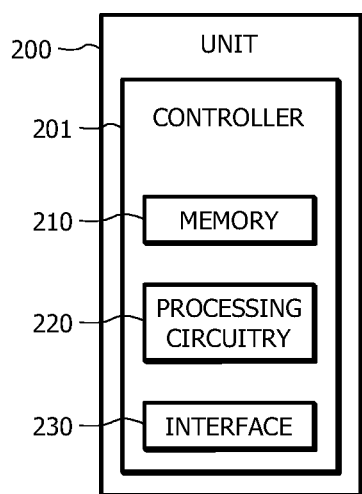
FIG. 2 illustrates an example unit.

Referring now to FIG. 2, system 100 may include one or more units 200 with controllers 201 that control operation of one, some, or all components within the system to meet a demand. In the illustrated embodiment of FIG. 2, controller 201 includes a memory 210, processing circuitry 220, and an interface 230. In an embodiment, controller 201 may comprise, or be coupled to, a computer-readable medium with memory 210 for storing control logic or instructions for operating HVAC system 100 components. Controller memory 210 may be a volatile or non-volatile memory of any known type commonly used in HVAC systems. Controller 201 may store computer executable instructions within memory 210. The computer executable instructions may be included in computer code. Controller 201 may be implemented with hardware, software, firmware, or any combination thereof.

Controller 201 may, additionally, be implemented with processing circuitry 220 for executing stored instructions. Controller 201 may be responsive to or operable to execute instructions stored as part of software, hardware, integrated circuits, firmware, micro-code or the like. The functions, acts, methods or tasks performed by controller 201, as described herein, may be performed by processing circuitry 220 executing instructions stored in memory 210. The instructions are for implementing the processes, techniques, methods, or acts described herein. Controller processing circuitry 220 may be any known type of processing circuitry commonly used in HVAC systems. The processing circuitry may be a single device or a combination of devices, such as associated with a network or distributed processing. Controller 201 may operably couple to HVAC system 100 components via wired or wireless connections.

Controller 201 may receive data, which may comprise signals from one or more remote sensing devices. The data received by controller 201 may be received directly from one or more remote sensing devices, or, may be received indirectly through one or more intermediate devices such as a signal converter, processing circuitry, an input/output interface (e.g. network 103), an amplifier, a conditioning circuit, a connector, and the like. Controller 201 may operate system 100 components in response to received data from remote sensing devices. Additionally, controller 201 may operate HVAC system 100 components in response to user input, demands of the conditioned space, refrigerant and/or ambient air conditions, control logic, and the like. In some embodiments, unit 200 may also include various refrigeration components as described in further detail in FIG. 3.

Figure 3:
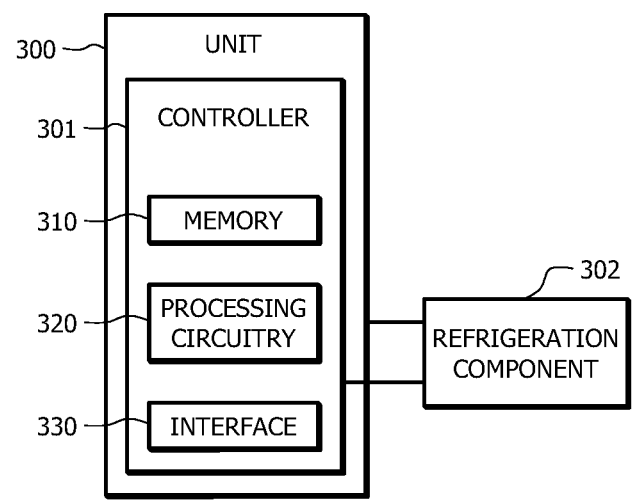
FIG. 3 illustrates an example unit coupled to a refrigeration component.

FIG. 3 illustrates an example unit 300 in system 100. Unit 300 may be the same kind of unit as described with respect to FIG. 2 but may in addition to the features illustrated in FIG. 2 also include a refrigeration component 302. Refrigeration component 302 is used in the general sense and may be any component commonly used in HVAC systems, such as an evaporator coil, condensing unit, heat exchanger, heat pump, refrigerant lines, blower fan, condenser fan, and/or a compressor. In certain embodiments, controller 301 may be coupled to a controller refrigeration component 302 as part of controlling the operation of the VRF HVAC system.

Figure 4:
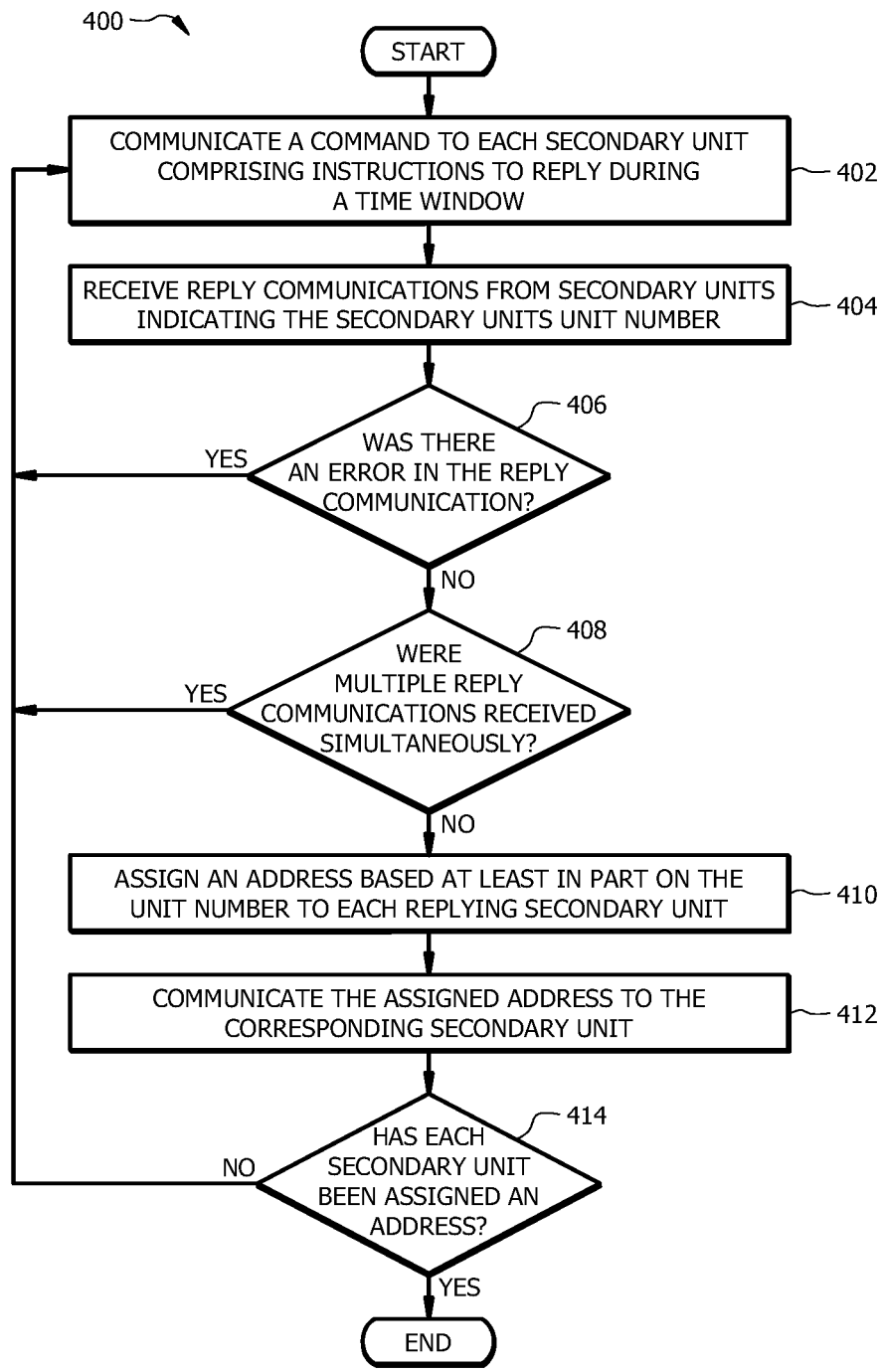
FIG. 4 is a flowchart illustrating a method that may be performed by an example primary unit.

FIG. 4 is a flowchart illustrating a method of operating example multi-unit HVAC systems from the perspective of the primary unit 101. In particular embodiments, primary unit 101 may perform all of the steps of method 400. In some embodiments, primary unit 101A initiates method 400 in step 402. In step 402 the primary unit 101A communicates a command to every secondary unit 110 by broadcasting the command with instructions for the unaddressed secondary units 110 to reply during a time window. For example, primary unit 101A may use address 00h to broadcast instructions to secondary units 110. If system 100 includes multiple primary units 101A, 101B, and 101C, each primary unit may be configured to address its respective secondary units 110, 115, and 120. As an example, each primary unit 101 may assign addresses from an address pool (e.g., 1-n) that is based on the maximum number of secondary units per primary unit 101 along with a unique prefix associated with the respective primary unit 110 (e.g., primary unit 101A may assign addresses $A_{1-n}$ and primary unit 101B may assign addresses $B_{1-n}$). Alternatively, in some embodiments, primary unit 101A may be configured to manage addressing for all of the secondary units 110, 115, and 120 of system 100.

In some embodiments, the length of the time window communicated in step 402 may be based at least in part on the number of secondary units 110 being configured by primary unit 101A. For example, as discussed below, each secondary unit 110 may respond during a respective time slot within the time window. In certain embodiments, the beginning of the time slot is based on the equation X+K*N, wherein X is an initial wait time, K is a scaling factor, and N is a random number. In certain embodiments, X may be selected to delay responses in order to allow primary unit 101 and/or secondary units 110 processing time to prepare for the next steps and/or to cause the responses to align with a time slot boundary. In certain embodiments, X may be a value between 1 ms and 20 ms, such as 10 ms. In certain embodiments, K may be configured based on the duration of a slot or the amount of time required to process a response in order to space the timing of the responses from multiple secondary units 110. In certain embodiments, K may be a value between 1 and 100, such as 50. In certain embodiments, N may be a random number selected by the secondary unit 110. The pool of numbers from which N is selected may be large enough to reduce the likelihood of many secondary units 110 selecting the same value for N, but small enough to avoid prolonged response time. In certain embodiments, N may be a number between 0 and the maximum number of secondary units 110 capable of being addressed by primary unit 101. For example, if primary unit 101A is configured to address sixty four secondary units 110, N may be a random number between 0-63. The time window communicated in step 402 may be configured to allow a secondary unit 110 an opportunity to reply in the last available time slot (e.g., X+K*63).

In certain embodiments, in step 404 the primary unit 101 may receive a reply communications from secondary units 110. Each reply communication indicates the replying secondary unit 110's unique unit number. In certain embodiments, the unique unit number corresponds to a unique serial number of secondary unit 110.

After receiving the unique unit number of a secondary unit 110 in step 404 the primary unit 101 may error-check the reply communication in step 406. For example, the primary unit 101 may perform a cyclic redundancy check. If there was an error in the reply communication from the secondary unit 110, then the primary unit 101 may send a second command to all of the secondary units 110 by returning to step 402. If there was no error, the method may proceed to step 408.

In step 408 the primary unit 101 may also determine if there were two secondary units 110 which replied during the same time slot. Two secondary units 110 replying during the same time slot could lead to a bus contention and improper address assignment. If there were two secondary units 110 that replied simultaneously, then the primary unit 101 may send a second command to all of the secondary units 110 by returning to step 402. Otherwise, the method may proceed to step 410.

In step 410 if there were not multiple reply communications received simultaneously and there was no error in the reply communication, then the primary unit 101 may determine an address to assign to the replying secondary unit 110 from step 404. The determined address to be assigned to the replying secondary unit 110 may be based on the unique unit number received from the secondary unit 110. For example, if the unique unit number does not yet have an assigned address then the primary unit 101 may assign that secondary unit 110 an address. In certain embodiments, addresses may be selected sequentially from the available addresses. For example, a secondary device 110 replying in the earliest time slot would receive address 01h, a secondary device 110 replying in the next time slot would receive address 02h, a secondary device 110 replying in the next time slot after that would receive address 03h, and so on. Alternatively, addresses may be selected randomly from any of the available addresses. After assigning an address to a particular secondary unit 10, the primary unit 101 may associate that unique unit number with the assigned address and remove the assigned address from the pool of addresses available to be assigned.

In certain embodiments, in step 412 the primary unit 101 may communicate the assigned address to the corresponding secondary unit 110. The communication assigning the address may include the unique unit number or other unique information, such as a unique header or other field received in the reply message of step 404, so that each secondary unit 110 can determine its corresponding assignment message. All future communicates directed to this individual secondary unit 110 may be communicated using the assigned address now associated with that secondary unit 110. After the expiration of the time window in step 414, the primary unit 101 may determine whether every secondary unit 110 on system 100 has an assigned address. The primary unit 101 may repeat method 400 if there are still secondary units 110 without an assigned address. In some embodiments, primary unit 101 may automatically determine the number of secondary units 110 (e.g., based on a parameter configuration or a detection procedure) and may repeat the process until each secondary unit 110 has been assigned an address (or until primary unit 101 has performed a maximum number of rounds attempting to assign the addresses). In some embodiments, primary unit 101 displays the assigned addresses to a user and the user may initiate another round of method 400 if primary unit 101 does not display that it has an assigned address for all of the secondary units 110.

Figure 5:
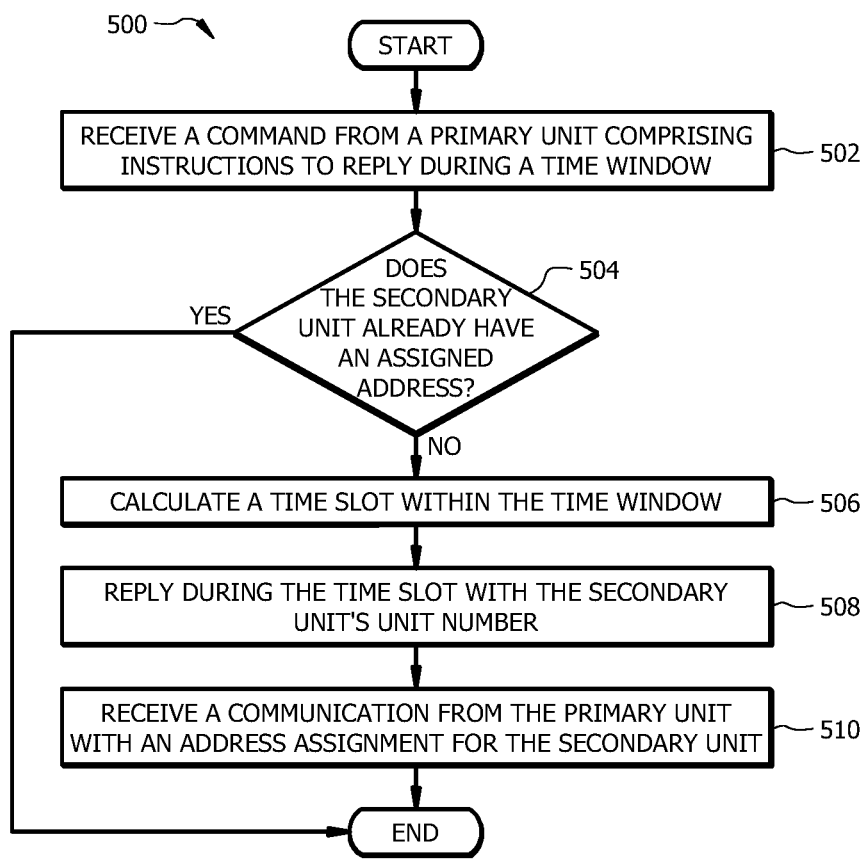
FIG. 5 is a flowchart illustrating a method that may be performed by an example secondary unit.

FIG. 5 is a flowchart illustrating a method of operation from the perspective of a secondary unit 110. In particular embodiments, secondary unit 110 may perform all of the steps of method 500. In some embodiments, secondary unit 110 may initiate method 500 in step 502. In step 502 the secondary unit 110 receives a command from the primary unit 101. The command comprises instructions to reply during a time window. For example, the command may be received on the broadcast address 00h intended for all units on system 100. In some embodiments, the instructions in step 502 to reply during a time window may specify instructions for selecting a time slot within the time window. The instructions for selecting a time slot within the time window may be based at least in part on the number of secondary units 110 on system 100.

In certain embodiments, in step 504 the secondary unit 110 may determine if it has already been assigned an address. If the secondary unit 110 already has an assigned address then the secondary unit 110 may end the method 500. For example, a secondary unit 110 may already have an assigned address if method 500 has been previously performed or if an address had been manually entered by a user. If the secondary unit 110 does not already have an address in step 504 then it may continue to step 506.

In certain embodiments, in step 506 the secondary unit 110 may calculate a time slot within the time window based on the received instructions from the primary unit 101 in step 502 (or, in certain alternative embodiments, based on rules maintained by secondary unit 110). The time slot may be a fractional amount of time during the time window. For example, for a system 100 with sixty-four secondary units 110 on network 102 coupled to primary unit 101, the time slot may be one sixty-fourth of the time window instructed by primary unit 101 (e.g., the time slot may be calculated as X+K*N ms where N is a random number 0 to 63) to reduce the number of potential bus contentions resulting from multiple secondary units 110 replying simultaneously.

In certain embodiments, in step 508 the secondary unit 110 would reply to the primary unit 101 with its unique unit number in the reply communication payload during the time slot calculated in step 506. For example, the unique unit number included in the reply communication payload may be the unit's serial number. In step 510 the secondary unit 110 may receive a communication for the primary unit 101 with an address assignment intended to be used as the address of that secondary unit 110 for all future communications. The secondary unit 110 may save this address assignment in memory 210/310 to be used to receive future communications from the primary unit 101 at that address.

Figure 6:
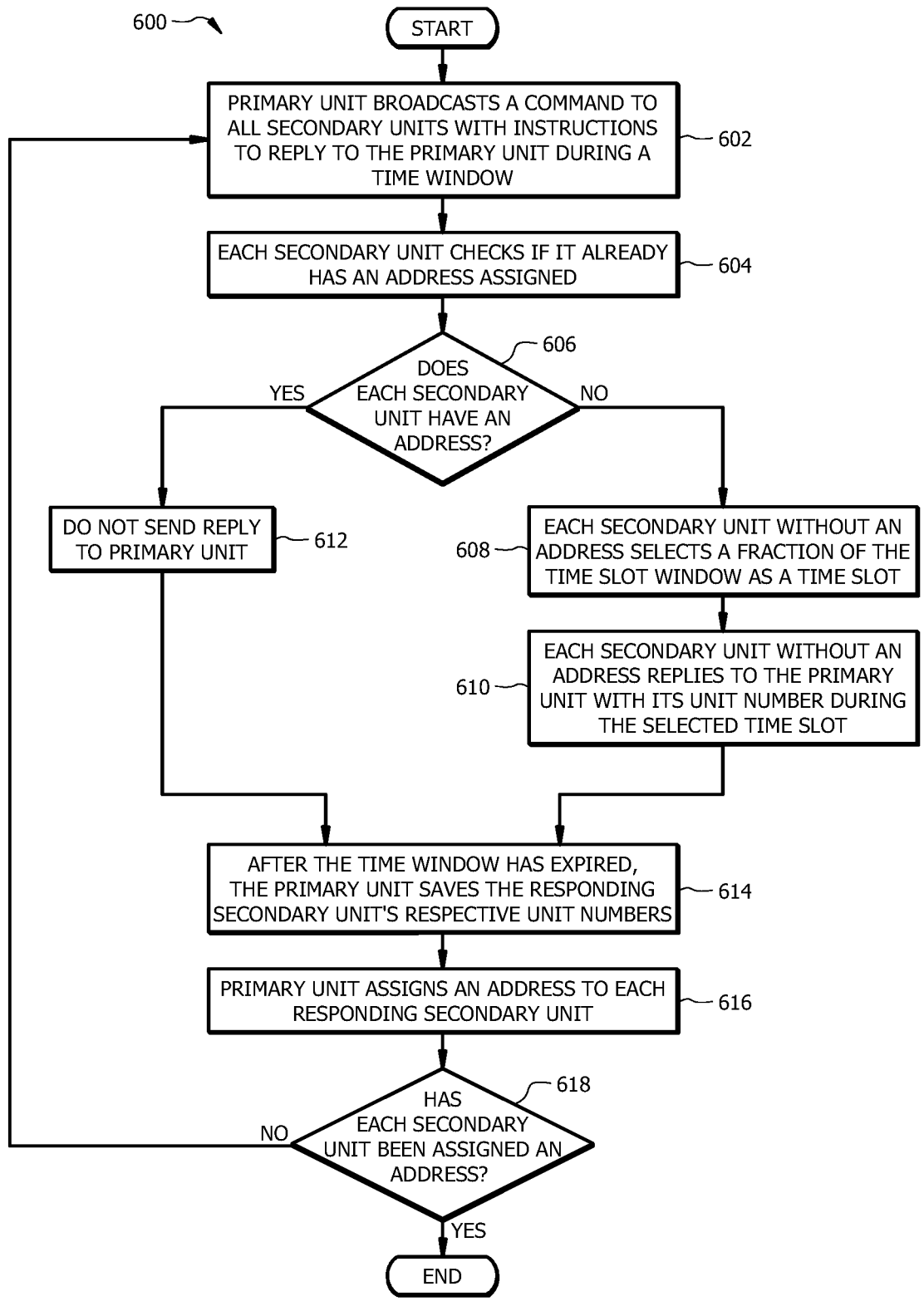
FIG. 6 is a flowchart illustrating a method that may be performed by an example system of a primary unit and a plurality of secondary units.

FIG. 6 is a flowchart illustrating a method of operating example multi-unit HVAC systems. In some embodiment, primary unit 101 may initiate step 602 and broadcast a command to all secondary units 110 with instructions to reply to the primary unit 101 during a time window. For example, primary unit 101 may broadcast instructions using address 00h to all units on system 100. In some embodiments, the instructions to reply during a time window may include instructions to select a time slot during the time window. The time slot may be a fractional amount of time based at least in part on the number of secondary units 110 on system 100.

In certain embodiments, in step 604 each secondary unit 110 may check its memory 210 or 310 to see if it has already been assigned an address primary unit 101. For example, a secondary unit 110 may already have an assigned address if method 600 has been previously performed or if an address had been manually entered by a user. In step 606, if the secondary unit 110 has already been assigned an address from the primary unit 101 then it may determine not to send a reply communication to the primary unit 101 in step 612. However, in step 606, if the secondary unit 110 has not already been assigned an address from the primary unit 101 then it may proceed to step 608.

In step 608, the secondary unit 110 may select a time slot within the time window from the primary unit's instructions in step 602. The time slot may be a fractional amount of time during the time window. For example, for a system 100 with sixty-four secondary units 110 on network 102 coupled to primary unit 101, the time slot may be one sixty-fourth of the time window instructed by primary unit 101 (e.g., the time slot may be calculated as X+K*N ms where N is a random number from 0 to 63) to reduce the number of potential bus contentions resulting from multiple secondary units 110 replying simultaneously. In some embodiments, the secondary unit 110 would pick the time slot within the time window at random. The random selection may be accomplished by implementing a computation random number generator using processing circuitry 220/320 or a pseudorandom number generator. In some embodiments, the serial number associated with the device may be used as a seed value for the random number computation algorithm. In certain embodiments, in step 610 the secondary units 110 may all, after selecting a time slot within the time window, reply to the primary unit 101 during their selected time slot within the time window. In some embodiments, the secondary unit 110's reply payload may contain the secondary unit's unique unit number.

In certain embodiments, in step 614 when the primary unit 101 receives a reply containing the unique unit number from a single secondary unit 110 during a single time slot within the time window, the primary unit 101 may save the responding secondary unit's unique unit number to memory 210/310. In step 616, the primary unit 101 may determine an address to assign to the unique unit number. The address may be selected from the remaining available addresses and may be assigned in any order (e.g., sequentially, randomly, etc.). In step 616 the primary unit 101 may also communicate the assigned address to the respective secondary unit 110 that replied and is now associated with the assigned address. For example, when the primary unit 101 receives a reply from secondary unit 110B with serial number IDU_002 the primary unit 101 may save the serial number to memory 210/310 and then send an assign command to that secondary unit 110B with the first available address 01h, when the primary unit 101 receives a reply from secondary unit 110A with serial number IDU_001 the primary unit may save the serial number to memory 210/310 and then send an assign command to that secondary unit 110A with the next available address 02h, when the primary unit 101 receives a reply from secondary unit 110C with serial number IDU_003 the primary unit may save the serial number to memory 210/310 and then send an assign command to that secondary unit 110C with the next available address 03h, continuing in this fashion until all of the secondary units 110 have replied or the time window expires. In step 614, if the primary unit 101 receives replies from two or more secondary units 110 in the same time slot (e.g., bus contention) and/or receives any replies which do not pass a cyclic redundancy check (CRC) then the primary unit may ignore those replies.

In certain embodiments, in step 618 a determination may be made as to whether all of the secondary units 110 on system 100 have been assigned an address. This determination may be made by the primary unit 101 or by user selection after primary unit 101 displays the number of secondary units 101 with assigned addresses. For example, the primary unit 101 may detect that the number of secondary units 110 coupled to the system 100 is greater than the number of secondary units 110 for which the primary unit 101 maintains an associated address or by the primary unit 101 failing to receive a reply from each unassigned secondary unit 110 within the time window. If there are still secondary units 110 that do not have an assigned address, for instance if they replied simultaneously resulting in a bus contention, or if the message contained an error detected by the CRC, then the primary unit 101 may reinitiate method 600. To reinitiate method 600, primary unit 101 broadcasts a second command by returning to step 602. The second command includes a second time window. This loop of method 600 may continue until all secondary units 110 have been assigned an address. In some embodiments, the primary unit 101 may perform a predetermined maximum number for rounds of address assignment. If there any secondary unit 110 on the system 100 remains without an assigned address after the maximum number of rounds, the primary unit 101 may notify a user that there is an error. With every successive loop of method 600 the probability of a potential bus contentions from simultaneous replies from secondary units 110 may decrease because as more secondary units 110 received their assigned addresses, fewer units may be replying during the time window.

Modifications, additions, or omissions may be made to any of the methods disclosed herein. These methods may include more, fewer, or other steps, and steps may be performed in parallel or in any suitable order. Throughout the disclosure, the term HVAC is used in a general sense and refers to any system that circulates refrigerant in order to control the temperature of a conditioned space. Examples include heat pump systems, air conditioning systems, combined heating-and-air conditioning systems, and refrigeration systems. Similarly, the term refrigerant is used in a general sense and refers to any medium that facilitates heat transfer in an HVAC system. Examples include natural refrigerants, such as carbon dioxide, ammonia, water, air, etc., conventional refrigerants, or coolants. Throughout the disclosure, the term VRF is used in a general sense and refers to any system that circulates refrigerant at multiple rates rather than simple on/off functionality. Examples include variable speed compressor HVAC systems and multi-compressor HVAC systems which may selectively disengage compressors to achieve variable refrigerant flow rates.

While discussed as certain components of the HVAC system controller performing the steps, any suitable component or combination of components may perform one or more steps of these methods. Certain examples have been described "looping," "repeating," or "reinitiating" certain steps, it is understood that for each iteration the count will increase incrementally from "first," "second," "third," and so forth (e.g., a first command, first received reply, first determined address; followed by a second command, second received reply, second determined address; followed by a third command, third received reply, third determined address, etc.). Otherwise, unless the context in which the modifiers "first," "second," etc. appear indicates otherwise, the modifiers do not require any particular sequence of steps or arrangement of devices.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system, comprising:
a primary unit; and
a plurality of secondary units, wherein each secondary unit has a unique unit number;
the primary unit configured to:
communicate a first command to each secondary unit, wherein the first command comprises an instruction to reply during a time window having a length based at least in part on the number of secondary units in the plurality of secondary units;
receive a reply communication from at least one of the secondary units, wherein the reply communication indicates the secondary unit's unique unit number; and
determine an address to assign to the replying secondary unit, the address determined based at least in part on the received unique unit number;
the secondary unit configured to calculate, based on at least the secondary unit's unique unit number, a time slot within the time window and to send the reply communication within the time slot
wherein:
the system comprises a heating ventilation and air conditioning (HVAC) system and the primary unit comprises a controller and each of the secondary units comprises a refrigeration component and a secondary unit controller, the controllers communicatively coupled to the system via a network;
the primary unit is further configured to communicate an HVAC-related configuration to one of the secondary units using the assigned address; and
the secondary unit to which the HVAC-related configuration is addressed is further configured to use the HVAC-related configuration to perform an HVAC-related operation.

2. The system of claim 1, wherein the primary unit is further configured to communicate the assigned address to the corresponding secondary unit.

3. The system of claim 1, wherein the primary unit is further configured to display a number of secondary units for which the primary unit maintains an associated address.

4. The system of claim 3, wherein the primary unit is further configured to:
communicate a second command to each secondary unit that has not been assigned an address, wherein the second command comprises a second instruction to reply during a second time window;
receive a reply communication from at least one of the secondary units that has not been assigned an address, wherein the reply communication indicates the secondary unit's unique unit number; and
determine an address to assign to the replying secondary unit, the address determined based at least in part on the received unique unit number.

5. The system of claim 1, wherein the unique unit number is the secondary unit's serial number.

6. The system of claim 1, wherein the secondary unit is configured to determine not to reply to the first command if the secondary unit already has an assigned address.

7. The system of claim 1, wherein the primary unit is further configured to:
detect a bus contention based on receiving a reply communication from a first secondary unit and a reply communication from a second secondary unit during a same time slot within the time window;
determine not to assign an address to the first secondary unit based on detecting the bus contention;
communicate a second command to the first secondary unit, wherein the second command comprises a second instruction to reply during a second time window;
receive a second reply communication from the first secondary unit in response to the second command, wherein the second reply communication does not cause a bus contention and the second reply indicates the first secondary unit's unique unit number; and
determine an address to assign to the first secondary unit, the address determined based at least in part on the first secondary unit's unique unit number received in the second reply communication.

8. The system of claim 1, wherein the primary unit is further configured to:
receive a first reply communication from a first secondary unit;
perform a cyclic redundancy check (CRC) on the first reply communication;
detect an error with the first reply communication based on the CRC;
determine not to assign an address to the first secondary unit in response to detecting the error with the first reply communication;
communicate a second command to the first secondary unit, wherein the second command comprises a second instruction to reply during a second time window;
receive a second reply communication from the first secondary unit in response to the second command, wherein the second reply communication passes the CRC and indicates the first secondary unit's unique unit number; and
determine an address to assign to the first secondary unit, the address determined based at least in part on the first secondary unit's unique unit number received in the second reply communication.

9. A controller for a primary unit of a heating ventilation and air conditioning (HVAC) system, the controller comprising:
processing circuitry and an interface, the interface configured to:
communicate a first command to each of a plurality of secondary units via a network, wherein each secondary unit has a unique unit number and each secondary unit comprises a refrigeration component and a secondary unit controller communicatively coupled to the network, wherein the first command comprises an instruction to reply during a time window having a length based at least in part on the number of secondary units in the plurality of secondary units; and
receive a reply communication from at least one of the secondary units, wherein the reply communication indicates the secondary unit's unique unit number;
the processing circuitry configured to:
determine an address to assign to the replying secondary unit, the address determined based at least in part on the received unique unit number; and
the interface further configured to:
communicate an HVAC-related configuration to one of the secondary units using the assigned address, the HVAC-related configuration configured to facilitate performing an HVAC-related operation by the secondary unit to which the HVAC-related configuration is addressed;

wherein the received reply communication is received during a time slot within the time window, the time slot calculated by the secondary unit controller of the replying secondary unit based on at least the replying secondary unit's unique unit number.

10. The controller of claim 9, wherein the controller is further configured to display a number of secondary units for which the primary unit maintains an associated address.

11. The controller of claim 10, wherein the controller is further configured to:
communicate a second command to each secondary unit that has not been assigned an address, wherein the second command comprises a second instruction to reply during a second time window;
receive a reply communication from at least one of the secondary units that has not been assigned an address, wherein the reply communication indicates the secondary unit's unique unit number; and
determine an address to assign to the replying secondary unit, the address determined based at least in part on the received unique unit number.

12. The controller of claim 9, wherein the controller is further configured to:
detect a bus contention based on receiving a reply communication from a first secondary unit and a reply communication from a second secondary unit during a same time slot within the time window;
determine not to assign an address to the first secondary unit based on detecting the bus contention;
communicate a second command to the first secondary unit, wherein the second command comprises a second instruction to reply during a second time window;
receive a second reply communication from the first secondary unit in response to the second command, wherein the second reply communication does not cause a bus contention and the second reply indicates the first secondary unit's unique unit number; and
determine an address to assign to the first secondary unit, the address determined based at least in part on the first secondary unit's unique unit number received in the second reply communication.

13. The controller of claim 9, wherein the controller is further configured to:
receive a first reply communication from a first secondary unit;
perform a cyclic redundancy check (CRC) on the first reply communication;
detect an error with the first reply communication based on the CRC;
determine not to assign an address to the first secondary unit in response to detecting the error with the first reply communication;
communicate a second command to the first secondary unit, wherein the second command comprises a second instruction to reply during a second time window;
receive a second reply communication from the first secondary unit in response to the second command, wherein the second reply communication passes the CRC and indicates the first secondary unit's unique unit number; and
determine an address to assign to the first secondary unit, the address determined based at least in part on the first secondary unit's unique unit number received in the second reply communication.

14. A non-transitory computer readable medium comprising logic of a heating ventilation and air conditioning (HVAC) system that, when executed by processing circuitry of a primary unit, is configured to cause the primary unit to perform steps comprising:
communicating a first command to each of a plurality of secondary units via a network, wherein each secondary unit has a unique unit number and each secondary unit comprises a refrigeration component and a secondary unit controller communicatively coupled to the network, wherein the first command comprises an instruction to reply during a time window having a length based at least in part on the number of secondary units in the plurality of secondary units;
receiving a reply communication from at least one of the secondary units, wherein the reply communication indicates the secondary unit's unique unit number;
determining an address to assign to the replying secondary unit, the address determined based at least in part on the received unique unit number; and
communicating an HVAC-related configuration to one of the secondary units using the assigned address, the HVAC-related configuration configured to facilitate performing an HVAC-related operation by the secondary unit to which the HVAC-related configuration is addressed;
wherein the received reply communication is received during a time slot within the time window, the time slot calculated by the secondary unit controller of the replying secondary unit based on at least the replying secondary unit's unique unit number.

15. The computer readable medium of claim 14, wherein the logic, when executed by the processing circuitry of the primary unit, is further configured to cause the primary unit to perform steps comprising:
communicating a second command to each secondary unit that has not been assigned an address, wherein the second command comprises a second instruction to reply during a second time window;
receiving a reply communication from at least one of the secondary units that has not been assigned an address, wherein the reply communication indicates the secondary unit's unique unit number; and
determining an address to assign to the replying secondary unit, the address determined based at least in part on the received unique unit number.

16. The computer readable medium of claim 14, wherein the logic, when executed by the processing circuitry of the primary unit, is further configured to cause the primary unit to perform steps comprising:
detecting a bus contention based on receiving a reply communication from a first secondary unit and a reply communication from a second secondary unit during a same time slot within the time window;
determining not to assign an address to the first secondary unit based on detecting the bus contention;
communicating a second command to the first secondary unit, wherein the second command comprises a second instruction to reply during a second time window;
receiving a second reply communication from the first secondary unit in response to the second command, wherein the second reply communication does not cause a bus contention and the second reply indicates the first secondary unit's unique unit number; and
determining an address to assign to the first secondary unit, the address determined based at least in part on the first secondary unit's unique unit number received in the second reply communication.

17. The computer readable medium of claim 14, wherein the logic, when executed by the processing circuitry of the primary unit, is further configured to cause the primary unit to perform steps comprising:
- receiving a first reply communication from a first secondary unit;
- performing a cyclic redundancy check (CRC) on the first reply communication;
- detecting an error with the first reply communication based on the CRC;
- determining not to assign an address to the first secondary unit in response to detecting the error with the first reply communication;
- communicating a second command to the first secondary unit, wherein the second command comprises a second instruction to reply during a second time window;
- receiving a second reply communication from the first secondary unit in response to the second command, wherein the second reply communication passes the CRC and indicates the first secondary unit's unique unit number; and
- determining an address to assign to the first secondary unit, the address determined based at least in part on the first secondary unit's unique unit number received in the second reply communication.

\* \* \* \* \*